Oct. 3, 1944.  I. BARENS  2,359,460
EDUCATIONAL DEVICE
Filed Nov. 17, 1943   2 Sheets-Sheet 1

INVENTOR
I. BARENS
BY
ATTORNEYS

Oct. 3, 1944.                I. BARENS                2,359,460
                        EDUCATIONAL DEVICE
                    Filed Nov. 17, 1943          2 Sheets-Sheet 2
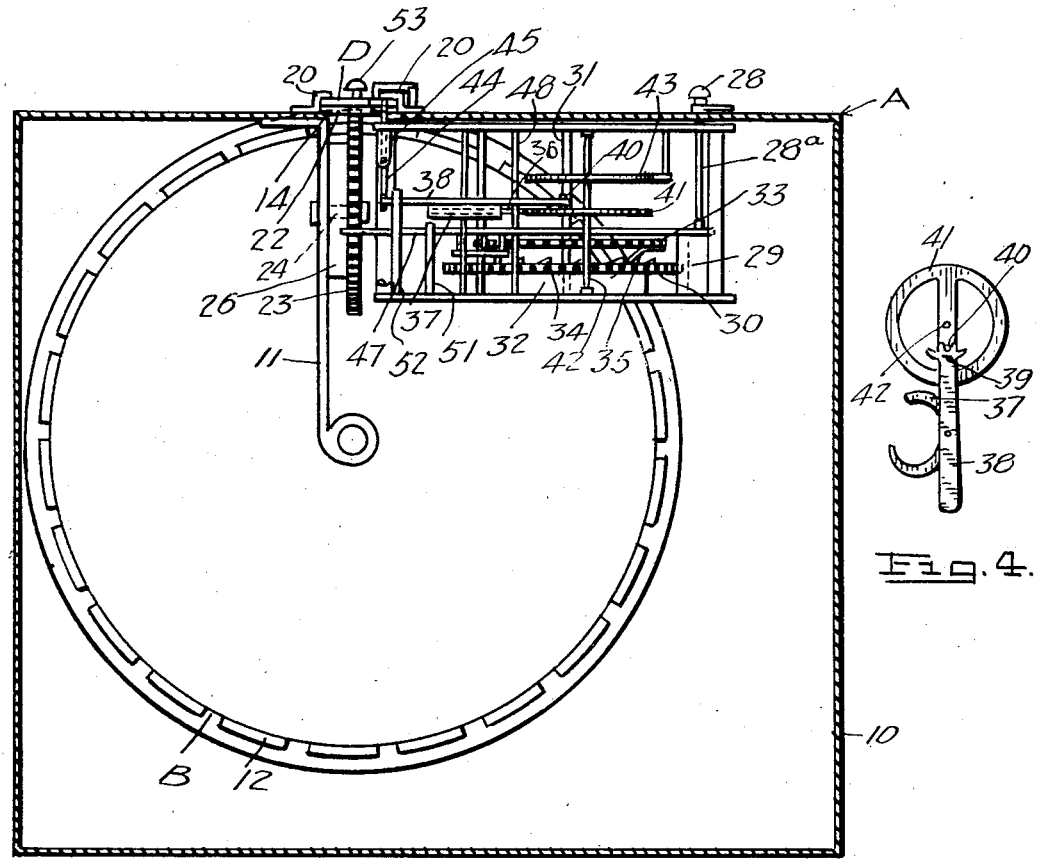
Fig. 2.
Fig. 4.
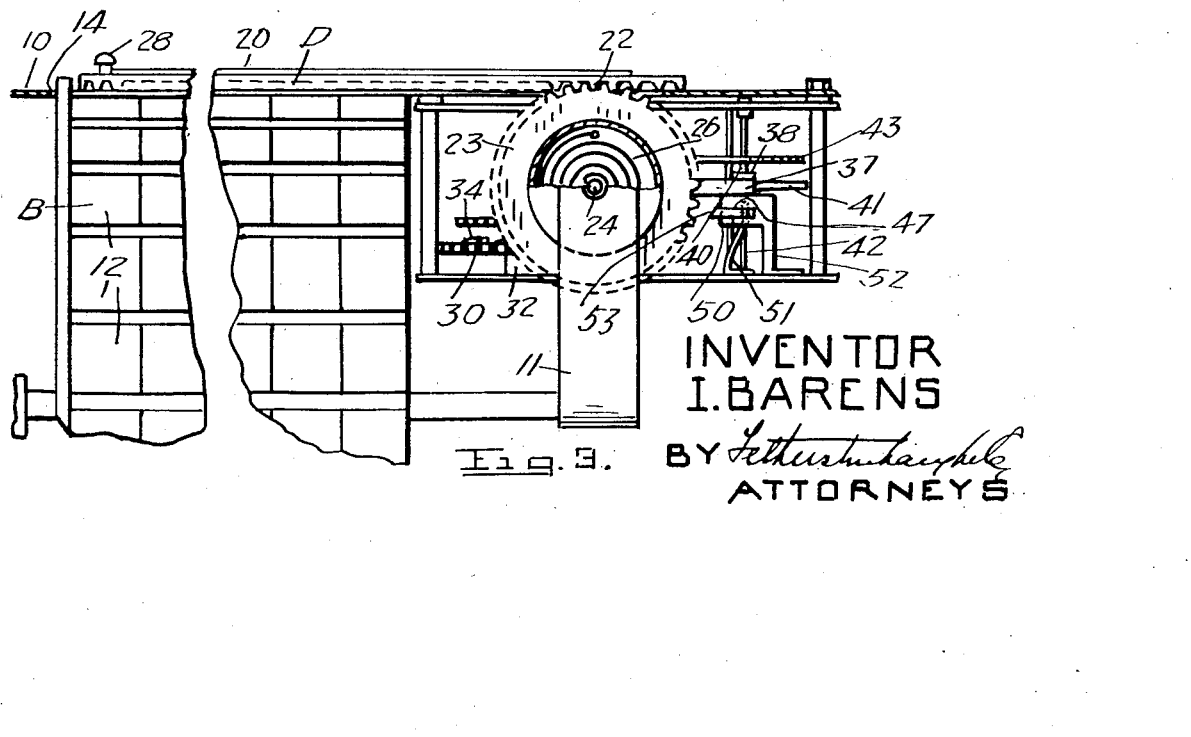
Fig. 3.
INVENTOR
I. BARENS Patented Oct. 3, 1944

2,359,460

UNITED STATES PATENT OFFICE 2,359,460

EDUCATIONAL DEVICE

Ivor Barens, Toronto, Ontario, Canada

Application November 17, 1943, Serial No. 510,630

10 Claims. (Cl. 35—22)

This invention relates to educational toys or games.

It is an object of the present invention to provide a game designed particularly to test the powers of observation and memory.

A further object of the invention is to provide an educational toy or game which will have considerable fascination and may be employed in a competitive manner from the point of view of testing powers of memory and observation with one another.

A still further object of the invention is to provide a game of this character which embodies simple mechanical means readily operated in a varied and selected manner as may be desired.

A still further object of the invention is to provide a toy or game of this character which is generally simple in construction and which can be manufactured and marketed at a reasonable cost.

With these and other objects in view the invention generally comprises a casing having a member designed to carry indicia of various kinds in a series of groups, such casing being designed to expose one series at a time by means of a movable slide, with means for controlling the length of time said slide is open, whereby to give the operator a predetermined time to view the indicia of the series inspected before the slide is operated automatically to cover such series, thus, leaving the operator to remember all the objects and their sequence of occurrence as he viewed them. The invention incorporates selective adjustable timing mechanism for selecting and setting the time allowed for observations and cooperating features which will be fully understood by reference to the following detailed specification taken in conjunction with the accompanying drawings.

In the drawings:

Fig. 2 is a transverse section taken through the casing to show certain parts of the mechanism in cooperative relation.

Fig. 3 is a fragmentary partly sectional view taken longitudinally through the casing and illustrating in particular part of the mechanism for controlling the operation of the slide or obturator designed to cover and uncover a series of the indicia of the game for observation purposes.

Fig. 4 is a detailed view of the escapement mechanism of the clockwork timing mechanism.

Fig. 5 is a perspective view of one of the gear wheels of the clockwork mechanism illustrating a toothlike finger carried on its face.

Figure 1:
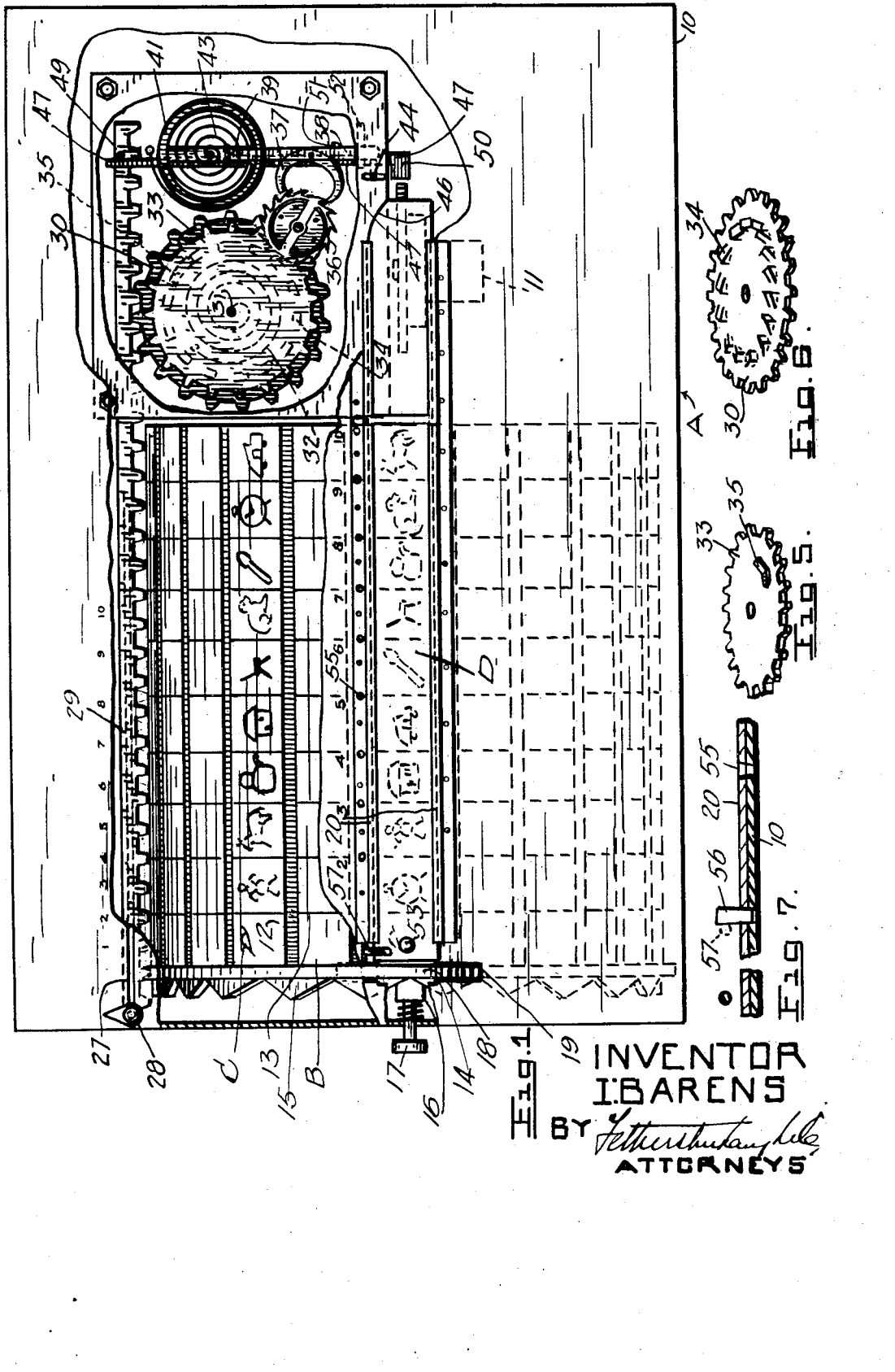
Fig. 1 is a top plan view of apparatus according to the present invention with the casing broken away to show certain parts of the mechanism in cooperative relation.

Fig. 6 is a perspective view of a cooperating gear wheel formed with crown teeth on one face designed to cooperate with the finger shown in Fig. 5, and Fig. 7 is an enlarged sectional detailed view taken through part of the guideway for the slide or obturator illustrating the use of a pin member designed to be selectively placed in orifices along the length of the guideway to form stop means for the slide or obturator at predetermined selected points.

Referring to the drawings, A indicates the game or educational device as a whole, employing any suitable casing 10 which in the preferred form of construction is designed to rotatably carry a drum B therein. The drum B is rotatably carried in the casing in any suitable manner such as by means of the suspended journal arms 11 (Fig. 2). The drum is designed to carry around its periphery indicia arranged longitudinally in series. This may be done by providing the drum with a plurality of longitudinally extending radially spaced apart slats 12 which are divided into any selected number of preferably equal sections 13, each section bearing certain indicia C, the indicia in each section differing from that in the preceding or succeeding section. The top of the casing is formed with a slot 14 running longitudinally thereof and of a width substantially corresponding to the width of the slats 12 so that each series of indicia on the slats may be exposed through this slot upon rotation of the drum to bring any desired slat to a position therebelow. The slot is normally closed by a slide member or obturator D.

The drum is provided with any suitable stop means temporarily retaining it stationary to expose a selected slat 12 through the slot 14. This may take the simple form of means illustrated in Fig. 1 by providing the crown teeth 15 on the end of the drum designed to be engaged by the spring pressed tooth or stop member 16 which may be released by the hand operated knob 17. Preferably the drum is provided with a radially protruding rim 18 which is designed to protrude through an opening 19 in the casing and, by means of this exposed portion of the rim 18, the user may rotate the drum.

The slide or obturator D is designed to be slidably carried in a suitable guideway which, in the form of construction illustrated, is provided by the spaced apart parallel angle strips 20, see Fig. 2 particularly. The slide or obturator D, as previously indicated, normally closes the slot 14 and one end thereof 21 projects beyond the extent of the drum B to engage with mechanism which controls the time during which the slide may be retained open. In this connection the lower face of the slide D is provided with a rack 22 which is designed to mesh with the teeth of gear 23 (Fig. 3) which is vertically disposed and rotatably mounted on the shaft 24. The shaft is journalled in any suitable means of support such as the support 11 and is spring actuated by the spiral spring 26, the action being that when the slide D is moved to the right it will rotate the gear 23 against the tension of the spring 26 so that when the slide is released the ordinary tendency would be for the gear 23 to return it to normal position under influence of the spring pressure. However, a means is provided for retaining the gear 23 against this return movement until it is released for such movement at a predetermined time. This mechanism will now be described.

Beyond the periphery of the drum B the casing is provided with a longitudinal slot 27 designed to permit the indicating head 28 to project therethrough. This head is connected by the pin or rod 28ᵃ (Fig. 2) with a longitudinally operated rack 29 which meshes with the horizontally disposed gear 30, mounted on the shaft 31. The gear 30 and shaft 31 are spring tensioned by the spiral spring 32 (dotted lines Fig. 1). Mounted coaxially on the shaft 31 is a second and smaller gear gear 33 which cooperates with gear 30. In this respect the gear 30 is provided with the sloped crown teeth 34, preferably die cut from the gear face, which are designed to be engaged by the spring finger 35 mounted on the face of gear 33, the relation being such that when the gear 30 is rotated by the rack 29 in a clockwise direction, the crown teeth 34 will slip over the spring finger 35 by reason of the location of their slope. Moreover, when the gear 30 is caused to rotate anti-clockwise by reason of the controlling spring 32, the flat projecting portion of the teeth 34 will engage the end of finger 35, thus to cause gear 33 to rotate with it.

The gear 33 is gear connected with the toothed escapement wheel 36 in the ordinary manner of clockwork mechanism. The escapement wheel is designed to coact with the cooperating double toothed member 37 which is pivotally mounted on the oscillating escapement arm 38, the latter having the toothed end 39 cooperating with the pin 40 of the balance wheel 41 of the clock mechanism which is rotatably mounted on the pintles 42 and controlled by the hair spring 43.

When the rack 29 is moved to the right rotating gear 30 against its tensioning spring 32, the crown teeth 34 will slip over the spring finger 35 of gear 33 but when this clockwise rotation of gear 34 has been terminated the gear will tend to rotate anti-clockwise under tension of the spring 32 and, due to the fact that the spring finger 35 will be engaged by a flat shoulder of one of the teeth 34 of gear 30, gear 33 will be caused to rotate with gear 34 in timed step-by-step relation as controlled by the escapement mechanism referred to. However, in order to prevent this return movement of the gear 30 until a predetermined time, a lever 44 pivotally mounted from a suitable bracket 45 (see Fig. 2), depends beside the lower end of the escapement arm 38, so as to prevent its oscillation and through this medium, therefore, the clockwork mechanism is locked against return movement.

The lever 44 is designed to project up through the casing and is disposed directly in the path of the slide or obturator, one edge of the side being bevelled or rounded as at 46 so that when the slide or obturator D is opened to the desired extent by sliding it to the right, the bevelled or curved edge 46, engaging the upper end of the lever 44, will deflect it causing it to swing about its pivot so that its lower end is swung out of the path of the escapement arm 38, thus permitting the clockwork mechanism to move freely. It is evident, therefore, that until the slide or obturator D is opened to the desired extent the clockwork mechanism if wound cannot begin to function.

In order to control the closing of the slide or obturator D in accordance with the operation of the timing mechanism a lever 47 is pivotally mounted intermediate its length on a suitable shaft 48 (Fig. 2) and one end thereof intersects the path of travel of the rack 29 and is designed at a predetermined time to be engaged by the projecting pin 49 projecting from the rack 29. The opposite end of the lever 47 is provided with a protruding tooth or member 50 which is normally urged into engagement with the teeth of gear 23. This may be effected by any spring means such as the leaf spring 51 (Fig. 3) which may engage one edge of the lever 47, to one side of the slotted supporting bracket 52 therefor. The tooth or stop member 50 of the lever 47 is provided with a bevelled edge 53 which even if it is disposed in the path of the teeth of gear 23 will not prevent the gear from being rotated in a clockwise direction but will stop it from rotation in an anti-clockwise direction. Consequently, as the slide or obturator D is moved to the right, with consequent rotation of the gear 23 by the rack 22, it will be held in the position to which it is moved by reason of the engagement of the tooth 50 in the teeth of the gear 23. However, if the timing mechanism is set in motion by the movement of the rack 29 to the right, it will be obvious that when the clockwork mechanism returns the rack 29 to normal position, the pin 49 of the rack upon engaging the opposite end of lever 47 will swing the latter on its pivot to remove the tooth 50 from engagement with the teeth of gear 23 and upon such release the spiral spring 26 will cause the gear 23 to rotate anti-clockwise thus returning the slide or obturator D to its normally closed position.

The slats 12 may be of any length desired and may carry any number of sections 13 to provide any number of indicia. In the present showing, however, ten different indicia are shown on each slat. The operator, therefore, may determine the number of indicia he may desire to consider and upon selecting, let us say five, to start with, will move the timing head 28 to the right until its pointer is disposed opposite to the numeral 5. This will wind the clock mechanism to a predetermined degree such as to permit a given length of time in which the operator may view five objects displayed through the slot 14, upon movement of the slide D to the right so as to uncover such five objects. For moving the slide a suitable handle 53 is provided. Moreover, in order to provide for movement of the slide accurately to this predetermined extent a suitable stop means is proposed. This may take the form of orifices 55 in one guide 20, opposite to division lines of each section, into which a suitable pin 56 (Fig. 7), may be projected, designed to engage with the laterally protruding pin or finger 57 projecting from the slide D. Consequently, upon selecting the number of indicia to be viewed the operator will insert the pin 56 in the appropriate orifices 55 so that when the slide is moved to the right it will be stopped at the predetermined point of engagement of the stop pin 57 with pin 56.

The graduations, appearing on the casing cooperating with the pointer of the timing mechanism, correspond in number to the number of sections 12 that appear in any one series and, are spaced apart to gradually vary in extent as illustrated. This is preferable for the reason that where the operator chooses a substantial number of indicia to remember, a comparatively greater length of time should be allotted within which to study this before the slide or closure member D is operated to shut off said indicia from view.

In operation, the operator should decide upon the number of objects that he is going to view at one time and should insert the stop pin 56 in the appropriate orifice 35. Let us say that he proposes to consider seven objects. The stop pin 56 is then placed in orifice 55 at 7 and the operator then actuates the head 28 of the timing mechanism to push the indicator to the right until it is opposite position 7. This moves the rack 29 to the right releasing pin 49 from engagement with the lever 47 which, under pressure of the spring 51 (Fig. 3), will cause this lever to swing upon its pivot and to engage its tooth 50 in the teeth of the gear 23. At the same time the movement of the rack 29 to the right rotates gear 30 and winds the associated spring 31.

During the rotation of gear 30 the crown teeth 34 thereof slip over the finger 35 of gear 33 but, when the spring 31 has been wound to the extent necessary governed by the extent to which rack 29 is moved to the right, the spring 31 will exert a back pressure and due to the fact that the shoulder portion, of one of the teeth 34 on gear 30, would engage the projecting end of the finger of gear 33, the back pressure will be transmitted to gear 33. Thus, through its gear connection with the escapement wheel 36, the latter will be caused to rotate, providing that the oscillating escapement arm 38 and its toothed member 37 may move and permit anti-clockwise rotation of gear 33 and gear 30, in step by step timed relation as governed by the oscillating escapement lever 38, balance wheel 41 and hair spring 43. However, the oscillating escapement arm 38 is normally prevented from oscillation by reason of its engagement with the lower end of lever 44. Thus, until this lever is moved from its normal position the timing mechanism cannot operate.

After moving the head 28 of the rack 29 to the selected position 7, which causes the foregoing movement and setting of the mechanism above described, the operator then grasps the handle 53 of the slide or closure member D and moves it to the right until the stop member 57 engages the pin 55 which has previously been positioned opposite to position 7 adjacent to the slide. This causes the slide to uncover seven of the sections 12 below the slide, which are thus exposed through the slot 14.

As the slide D is moved to the right, its rack 22 engaging the gear 23 causes it to rotate in a clockwise direction which is permitted by reason of the bevelled edge 53 of the finger 50 which, although engaged in the teeth of gear 23, will permit them to slip over this bevelled edge. However, when the slide has reached its set position the finger 50, still engaged in the teeth of gear 23, will prevent it from rotating anti-clockwise under influence of its spring 26 which, has been wound during the movement of the slide. Thus, the slide is maintained in the open position for a predetermined time governed by the clockwork mechanism, until through the latter, the tooth 50 is moved from engagement with the gear 23.

In moving the slide to its selected open position, the curved or bevelled end 46 of slide D engages the upwardly projecting end of lever 44 thus causing it to swing about its pivot and to move its lower end out of engagement with the oscillatable escapement arm 38. Thus, the timing mechanism is free to operate and the operator has a predetermined time to consider the seven different objects or indicia exposed in the slot 14 in order to be able to remember them after the slide is closed and to be able to recall them in their proper sequence. As the timing mechanism operates, the gears 30 and 33 rotate anti-clockwise in a step by step timed relation as governed by the clockwork mechanism and the rack 29 is gradually returned to its normal position. When it reaches its normal position, the pin 49 engages the adjacent end of the lever 47 which causes such lever to swing on its pivot and to move the teeth 50 out of engagement with the teeth of gear 23, so that the gear 23 is caused to rotate in an anti-clockwise direction under influence of its spring 26 and the slide or closure member D is immediately returned to normal position completely covering the slot 14 and hiding from view the objects or indicia which previously were viewed through the slot 14.

The operator now must recall all the objects or indicia which were viewed and be able to recall them in the sequence in which they occurred. If he is operating the device alone, he may write down on paper the names of the indicia and their proper sequence or, if he is employing the device in a competitive manner with another or others, he may call off the indicia previously viewed, in their proper sequence and a competitor may tabulate them. Preferably, however, it is proposed that the device should include a series of units or individual pieces of material bearing, one corresponding to each different indicia which may appear on the drum, and the operator can select from this group of units those units bearing the indicia which he viewed and he may then arrange such units in their proper sequence to correspond with the indicia as he viewed them. His arrangement can then be checked by again operating the slide or closure member D to the previous position, thus to check his answer or, in the case of using the device competitively, a competitor may mark down the objects so as to provide a check on the operator's answer after the slide is closed.

From the foregoing it will be apparent that I have provided a game which will test and improve one's powers of observation and memory which will have considerable fascination and provide an interesting competitive game. Moreover, it is apparent that by use of a simple clockwork unit and a simple number of added parts a game of this character may be produced at comparatively low cost. It is, of course, apparent that some changes may be made in the structure disclosed without departing from the spirit of the invention.

What I claim as my invention is:

1. An educational device comprising a casing, a movable member carried by the casing and having a plurality of series of indicia carried thereon, said casing having an opening therein to expose one series at a time of indicia therethrough, a closure member for said opening manually operable to selected positions to expose a selected number of indicia of the underlying series, means for retaining the closure member in said selected open position, timing means for releasing said retaining means and means operable successively to the timing means, for moving said closure member to close said opening and cover the exposed indicia at a predetermined time.

2. An educational device as claimed in claim 1 in which the movable member comprises a drum carrying the indicia in series longitudinally thereof, said drum being rotatable to expose any one series of indicia in said opening.

3. An educational device as claimed in claim 1 in which the timing mechanism includes an indicator movable to a set predetermined time for retaining the closure member in open set position.

4. An educational device as claimed in claim 1 in which the timing mechanism includes an indicator movable to a set predetermined time for retaining the closure member in open set position, and means is provided for stopping the closure member at a point co-related with the time set by the indicator.

5. An educational device comprising a casing, a movable member carried by the casing and having a plurality of series of indicia carried thereon, said casing having an opening therein to expose one series at a time of indicia therethrough, a closure member for said opening, manually operable to selected positions to expose a selected number of indicia of the underlying series, timing mechanism designed to control the closing operation of said closure member, means for setting said timing mechanism, means for maintaining said timing mechanism inactive, means actuated by the closure means, when opened, for rendering the timing means active, and means operable by the timing means at a predetermined time, for moving said closure member to close said opening and cover the exposed indicia.

6. An educational device comprising a casing, a rotatable drum carried within the casing and having a plurality of series of indicia thereon arranged longitudinally thereof, said casing having an opening therein to expose one of said series at a time therethrough, a closure member for said opening, manually operable to selected open positions to expose a selected number of indicia of the underlying series, means for retaining the closure member in the selected open position and timing mechanism operable at selected predetermined times for automatically returning said closure member to closed position.

7. An educational device as claimed in claim 6 in which means is provided for retaining the drum in set position, said means being temporarily releasable for rotation of the drum to an alternative position.

8. An educational device as claimed in claim 6 in which the timing mechanism includes clockwork mechanism, a rack movable to predetermined positions, said rack operating to wind the clockwork mechanism, said closure member having a rack connected therewith designed during movement to rotate a spring tensioned gear, a locking member designed to engage said latter gear to retain it against movement in one direction and means in connection with the rack of said timing mechanism for releasing said locking member at a predetermined time, causing said closure member to return to normally closed position.

9. An educational device comprising a casing, a rotatable drum carried within the casing and having a plurality of series of indicia carried thereon and arranged longitudinally thereof, said casing having an opening therein to expose one series of the indicia at a time, a slidable closure member for said opening manually operable to selected open positions to expose a selected number of indicia of the underlying series, a rack carried by said closure member, a spring tension gear rotatably mounted within the casing and engageable with said rack, said gear being rotated by said rack to increase the tension of its spring upon movement of the closure member to an open position, means engaging said gear preventing rotation in the opposite direction whereby to retain said closure member in the selected open position, timing mechanism carried by the casing including clockwork mechanism, means for setting the clockwork mechanism for operation including a winding rack and means for moving said rack to predetermined selected positions, said rack functioning to wind the clockwork mechanism when moved to a selected position, said clockwork mechanism being designed to operate for a predetermined period of time corresponding to the position to which said winding rack has been moved and means in connection with said winding rack operable to engage the means engaging and retaining the gear of the closure member for releasing said latter means at a predetermined time whereby automatically to return said closure member to normal position to cover the exposed indicia.

10. An educational device comprising a casing, a movable member carried by the casing and having a plurality of series of indicia carried thereon, said casing having an opening therein to expose one series at a time of indicia therethrough, a closure member for said opening manually operable to selected positions to expose a selected number of indicia of the underlying series, means for stopping said closure member at a predetermined selected position, means for retaining the closure member in said selected open position, timing mechanism operable at a predetermined time for releasing said retaining means to return said closure member to closed position and means on said casing cooperating with said timing means for indicating selected periods of duration for operation of said timing mechanism.

IVOR BARENS.